Oct. 29, 1940. R. HOFER ET AL 2,219,449
MODULATION
Filed May 1, 1937 2 Sheets-Sheet 2

INVENTORS
RUDOLF HOFER
RUDOLF GURTLER
BY
ATTORNEY

Patented Oct. 29, 1940

2,219,449

UNITED STATES PATENT OFFICE 2,219,449

MODULATION

Rudolf Hofer and Rudolf Gürtler, Berlin, Germany, assignors to Telefunken Gesellschaft für Drahtlose Telegraphie m. b. H., Berlin, Germany, a corporation of Germany Application May 1, 1937, Serial No. 140,134
In Germany April 1, 1936

4 Claims. (Cl. 179—171.5)

In all methods predicated upon modulation of an input stage of the transmitter, the power stage which takes the major part of the energy operates at low efficiency. While the modulation capability of the transmitter may run up to 100 percent, the efficiency of the power stage will at most be 35 percent at low modulation percentages.

Methods have been disclosed in the prior art which will insure an improvement of efficiency of the power stage to around 60 percent. Most widely known are the Chireix method and plate modulation of the final stage by means of class B-type push-pull audio amplifiers.

According to the method of this invention, the efficiency of the power stage of a transmitter may be raised even beyond what was possible with the methods of the prior art. The underlying principle is as follows:

The plate direct current and modulation potentials of the power stage are furnished from a grid-controlled (grid-excited) rectifier whose feed frequency is conveniently chosen higher than the highest frequency of modulation to be transmitted. Since the regulation of the direct current potential furnished from a gaseous-conduction rectifier of the said type is insured by a shift of the phase of the grid impulses, in accordance with this invention the phase of the potential impulses impressed upon the grid is here varied, at the rate or rhythm of the modulation. This type of regulation always makes for satisfactory efficiency of the rectifier, at all instantaneous values of its useful potential since current is supplied only at small plate potential at the rectifier.

Figure 1:
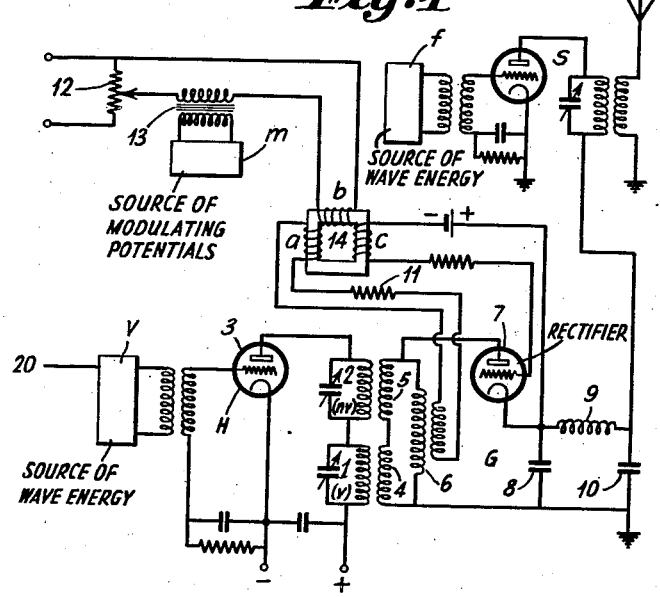
Figure 2:
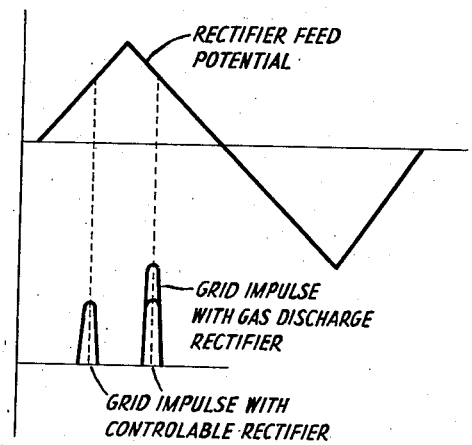
Figure 3:
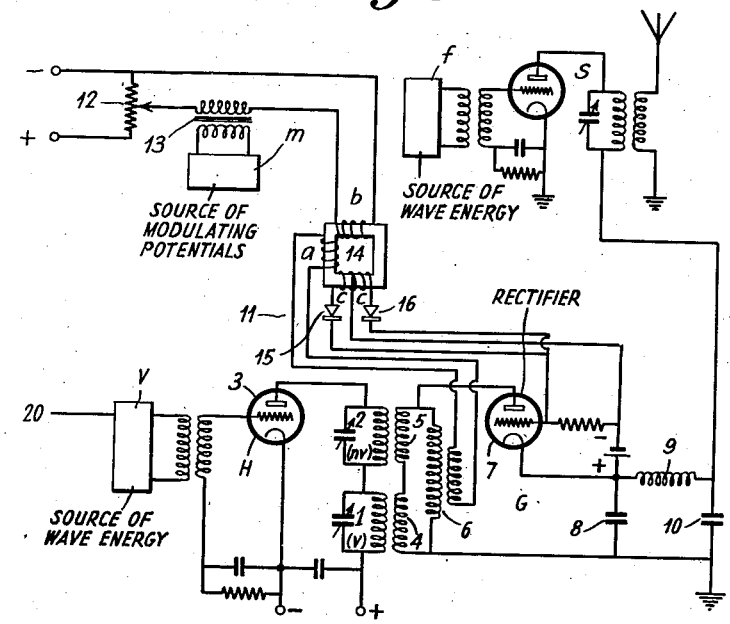
Figure 4:
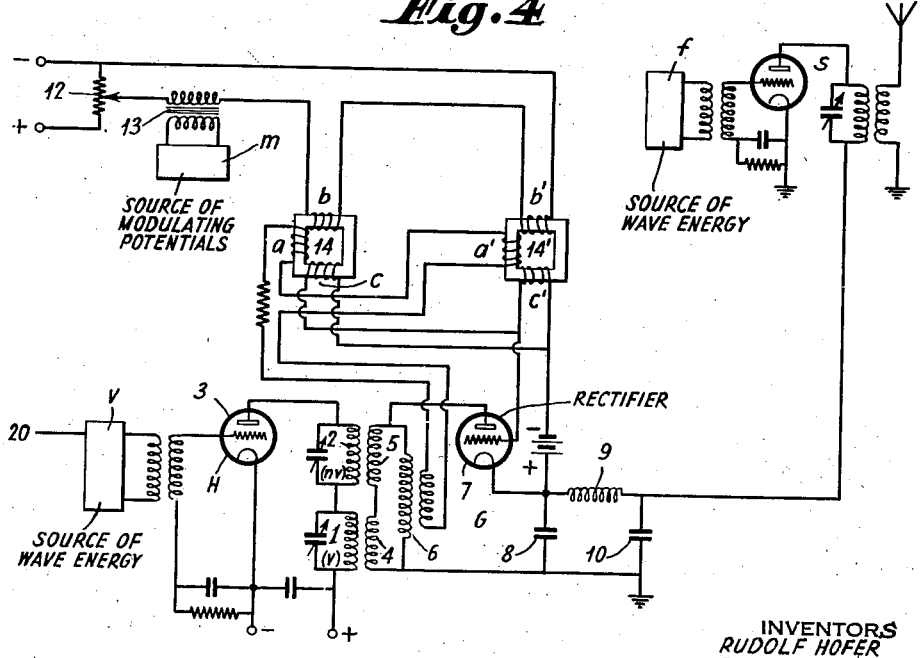

In describing the invention in detail reference will be made to the attached drawings, wherein Figure 1 shows one modification of my novel modulating system wherein an amplifier of wave energy has an electrode controlled in accordance with potentials derived from a rectifier having electrodes supplied by other wave energy and a control electrode supplied with still other wave energy, the phase of which is controlled in accordance with modulating potentials to control the operativeness of the rectifier;

Figures 3 and 4 are modifications of the arrangement of Figure 1. Figure 3 includes rectifier means for increasing the impulses on the control grid of the rectifier per cycle of energizing current to thereby improve the linearity of operation of the modulation system. Figure 4, which is a modification of Figure 3, includes a plurality of saturated cores and cooperating windings similar to the single core and winding of Figure 1; while Figure 2 illustrates the operation of the arrangement by means of curves.

Figure 1 schematically shows an exemplified embodiment of the invention. S is the power stage of a telephonic transmitter whose carrier frequency may be denoted by $f$. The plate direct current potential and the modulation potential are supplied through a rectifier G which is fed from an auxiliary generator H with a fundamental frequency V which suitably is a multiple of the highest modulation frequency, so as to insure modulation as free as feasible from distortion. The auxiliary generator or oscillator H may be of the self-exciting (self-oscillatory) or master excited type. In this latter case, if desired, there may be chosen $f=V$, and the control frequency for the auxiliary generator may be taken from a transmitter stage illustrated diagrammatically at 20. Moreover, the auxiliary transmitter may be utilized for the control of the transmitter power stage.

If the feed potential is sinuous, the phase shift of the grid potential impulses of the rectifier should occur roughly according to a function inverse to the sine function, so as to prevent distortions, it being assumed that the inner resistance of the rectifier is negligible.

Proportionality could be insured in a simpler manner by impressing rectifier G with peaked feed potential, and by varying the phase of the grid potential impulses in direct proportion to the instantaneous value of the supplied modulation potential.

Now, the operation of the circuit organization shown in Figure 1 is as follows: The direct current fed to tube 3 is changed into alternating current of fundamental frequency V, at satisfactory efficiency. The output electrodes of 3 are connected as shown to windings 1 and 2 coupled to windings 4 and 5 connected in series with the anode and cathode of rectifier 7. The control grid of 7 is coupled as shown to a winding c, of transformer 14. As will be described more in detail later the phase of the wave energy supplied by c to the grid of 7 is controlled in accordance with modulating potentials from M, in this manner controlling the output of rectifier 7 and the power supplied by 7 to the amplifier S in accordance with signals. The wave form of the potential impressed upon rectifier 7 may be rendered peaked, for instance, by providing a convenient number of resonance circuits, 1 and 2 in the output circuit of tube 3 which are tuned to odd harmonics of fundamental frequency and to which is coupled, with convenient closeness, the input circuit of rectifier 7 by means of coils 4 and 5. The required linear proportionality between the modulation potential and the phase angle of the grid potential may be insured, as known in the art, by a saturated transformer 14 wrapped with three windings, $a$, $b$, and $c$. Winding $a$ is impressed with a potential through transformer 6, an impedance 11 being inter-connected for the purpose of imparting a peaked wave form to the current flowing through winding $a$. Transformer 14 is saturated to such a high degree that pointed or peaked potential impulses are induced in the winding $c$, and these impulses will arise when the resultant ampere-turns pass through zero. This produces a negative impulse at the greatest rate of decrease of the flux, and a positive impulse at the greatest rate of increase of the flux, and in this case only the positive pulse is able or useful to cause the gaseous rectifier to pass current. This is shown in the curves of Figure 2. This impulse then takes place when the feed potential has passed its peak. It should be kept in mind that the feed potential or voltage, supplied by tube 3 to windings 5 and 4 and rectifier 7, is in phase with the peaked current in winding $a$, of the highly saturated transformer 14. The voltage induced in winding $c$ is rising then at its greatest rate when the peak of the feed potential to 7 has passed. Thus the grid of 7 gets a potential which causes it to pass current when the feed voltage has passed its peak. The separation of this grid impulse from the peak of the feed potential from 7 is a function of the saturation of transformer 14 and consequently of the modulating potentials so that the output of 7 is likewise a function of the modulating potentials. Winding $b$ is energized by a direct current through potentiometer 12 which, in the absence of modulation, determines the phase of the grid potential impulses and thus the value of the direct current potential furnished by rectifier 7. Through transformer 13 is supplied a modulation potential which varies the zero value of the resultant ampere-turns at the rhythm of the modulation in such a manner that proportionality exists between the phase of the grid impulses and the instantaneous value of the modulation potential. Auxiliary wave V and its harmonics are suppressed by band-pass filter comprising condensers 8 and 10 and inductance 9 with the result that only the direct potential and the modulation potential will reach the transmitter.

Rectifier tube 7 may consist of a high-vacuum tube or kenotron, or, preferably, because of lower internal resistance, of a gas-filled rectifier (for instance, an "iron" rectifier). It will be understood that in lieu of rectifier 7 a multi-phase rectifier circuit scheme could be used.

The embodiment according to Figure 1, and similar circuit organizations, have the peculiarity that the load put by rectifier G on the auxiliary generator H involves a reactive component whose value varies with the instantaneous value of the modulation potential, and this affects the efficiency of the rectifier.

Using rectifiers having a steady characteristic, that is to say, electronic rectifiers or kenotrons and which, contradistinct to the gaseous-conduction type, may be steadily controlled (excited) up and down, the chance of complex load conditions may be prevented for the "fundamental harmonic" of the feed frequency by doubling the positive grid potential impulses so that, at all instantaneous values of the modulation potential, they will act symmetrically, as to time, with respect to the crest of the feed alternating potential.

In Figure 2 are indicated the peaked rectifier feed potential and thereunder the grid impulses supplied to the rectifier. As shown therein one grid impulse is supplied to the rectifier when it is a gaseous conduction rectifier, and two impulses when it is a thermionic high vacuum rectifier. That is to say, with the former type of rectifier there will be only one grid impulse applied each half period or alternation of the feed potential, which impulse will, therefore, be non-symmetric to the crest of the feed potential, whereas it is advantageous with thermionic rectifiers to produce one grid impulse before and one grid impulse after the feed potential crest, as shown in the drawings. By the modulation potential in the case of gaseous-conduction rectifiers, the single grid impulse is shifted to and fro in phase In the case of thermionic rectifiers the modulation potential affects the interval between the two grid impulses Figures 3 and 4 show in schematic manner exemplified embodiments of a grid control of the said kind. Contradistinct to the arrangement in Figure 1, the embodiment in Figure 3 shows winding $c$ of transformer 14 with a center tap. In addition, two rectifiers 15 and 16 are arranged in a circuit with winding $c$ to cause the two impulses occurring symmetrically relative to the feed potential crest to produce positive grid potential. It is necessary in this case that the current flowing through winding $a$ should be in phase with the feed voltage at transformer 6.

In Figure 3 the rectifier 7 is of a type having a steady characteristic controllable by controlling its grid potential. The two rectifiers 15 and 16 now produce two positive impulses occurring when the decrease of the flux of transformer 14 is greatest and when the increase of the flux of transformer 14 is greatest. Note that negative impulses are ineffective. Here again the feed potential for 7 is in phase with the peaked current in $a$ and consequently the positive pulses occur one ahead of the peak voltage on 7 and one after the peak voltage on 7. See Figure 2 of the drawings. The sharpness in the saturation characteristic of 14 is a function of the modulation potentials at 13, so that the amplitude and the spacing of the impulses supplied by rectifier 7 for the output of S is a function of the modulating potential at 13.

In the case of quadrature relation between the said two quantities, recourse may be had to a scheme shown in Figure 4, which comprises two transformers 14 and 14' whose operation is similar to that described above. While windings $b$ and $b'$ are traversed in opposite sense by direct and modulation currents, the windings $a$, $a'$, and $c$, $c'$, respectively, are connected in the same sense.

The doubling of the active grid impulses as just described has this further advantage that the efficiency of the rectifier, for a given transmitter load, rises appreciably for the reason that the duration or length of current feed or flow periods during grid impulses decreases correspondingly. The same method may, of course, be used again also with multi-phase rectifier circuit organizations.

The power stage efficiency obtainable, at the present state of the art, with an arrangement of this invention is higher than that of the method disclosed and known in the earlier art and designed to raise the efficiency. Assuming the following unit efficiencies, namely 90% for the auxiliary generator, 98% for the rectifier (assuming that "ignition" or discharge type rectifiers are used), 80% for the power stage, then the overall efficiency of the power stage will be about 70%; and this high efficiency would be preserved also with high percentage modulations.

It is claimed:

1. In a modulation system, an electron discharge device having input electrodes excited by wave energy to be modulated and output electrodes connected in an output circuit, and means for modulating the wave energy at signal frequency comprising a rectifier having output electrodes connected with electrodes in said device to energize the same to control the operation of said device, said rectifier having input electrodes and a controlling electrode, a source of wave energy coupled to said input electrodes, a transformer having a plurality of windings, a coupling between said last named source and one of said windings, a coupling between the rectifier input electrodes and another of said windings and means for controlling the saturation of said transformer at signal frequency to control the phase relation of the wave energy on the controlling electrode and input of said rectifier to thereby control the energy supplied to said electrodes in said device.

2. In a modulation system, a wave energy amplifying device having input electrodes and output electrodes connected in alternating current circuits wherein high frequency wave energy flows and means for applying to an electrode of said device a potential which varies at signal frequency to thereby modulate said high frequency wave energy in said device and circuits in accordance with signals comprising, a rectifier tube having a control electrode and a pair of additional electrodes coupled with said electrode in said amplifier device, means for impressing wave energy on said additional electrodes whereby rectified potentials are impressed from said additional electrodes on said electrode of said amplifier device when said rectifier is operative, means for impressing wave energy of the same frequency as said last named wave energy on the control electrode of said rectifier to control the operation of said rectifier comprising, a saturated core, a windings thereon, means for supplying said wave energy to one of said windings on said core, a full wave rectifier having an output connected to said control electrode and an input coupled to a winding on said saturated core, and means for controlling the phase of said wave energy impressed on said control electrode substantially in accordance with modulating potentials to thereby control the amplitude of the potentials supplied from the additional electrodes of said rectifier to said electrode in said amplifier device comprising, a source of modulating potentials, and a coupling between an additional winding on said saturated core and said source of modulating potentials.

3. In a modulation system, a wave energy amplifying device having input electrodes and output electrodes connected in alternating current circuits wherein high frequency wave energy flows and means for applying to an electrode of said device a potential which varies at signal frequency to thereby modulate said high frequency wave energy in said device and circuits in accordance with signals comprising, a rectifier tube having a control electrode and a pair of additional electrodes coupled with said electrode in said amplifier device, means for impressing wave energy on said additional electrodes whereby rectified potentials are impressed from said additional electrodes on said electrode of said amplifier device when said rectifier is operative, means for impressing wave energy of the same frequency as said last named wave energy on the control electrode of said rectifier to control the operation of said rectifier and for controlling the phase of the wave energy impressed on said control electrode in accordance with modulating potentials to thereby control the amplitude of the potentials supplied from the additional electrodes of said rectifier to said electrode in said amplifier device comprising, a saturated core, a plurality of windings on said core, a source of modulating potentials connected to a winding on said core to control the saturation thereof, means for energizing one of said windings by wave energy of said same frequency, and means connecting another of said windings to said control electrode of said rectifier.

4. In a signalling system, an electron discharge device having input and output electrodes coupled in high frequency alternating current circuits in which high frequency wave energy to be modulated is caused to flow and means for modulating the potentials of certain of said electrodes at signal frequency to thereby control the amplitude of the high frequency wave energy in accordance with signals comprising, a rectifier having a anode and a cathode, control grid and having an anode and a cathode, means for producing wave energy of rectilinear form and impressing the same on the anode and cathode of said rectifier, means for impressing wave energy of the frequency of said produced wave energy on the control grid of said rectifier and for controlling the phase of said last named impressed wave energy in accordance with signalling potentials comprising, a saturated transforming core, a winding on said core, means for energizing said winding by wave energy of the frequency of said produced wave energy, a second winding on said core connected to said control electrode of said rectifier to impress thereon wave energy of the frequency of said produced wave energy, a source of signalling potentials, and means for controlling the saturation of said core in accordance with signalling potentials from said source to thereby control the phase of said wave energy impressed on said control electrode substantially in accordance with said signalling potentials to control the value of the rectified potentials, and means for impressing rectified potentials from the anode and cathode of said rectifier on electrodes of said device to control the operation thereof at signal frequency.

RUDOLF HOFER.
RUDOLF GÜRTLER.